(12) United States Patent
Jorgenson et al.

(10) Patent No.: US 7,555,008 B2
(45) Date of Patent: Jun. 30, 2009

(54) METHOD AND APPARATUS FOR PROVIDING A GIGABIT ETHERNET CIRCUIT PACK

(75) Inventors: Anthony William Jorgenson, Fremont, CA (US); Nicholas Joseph Possley, Gilroy, CA (US)

(73) Assignee: Forster Energy LLC, Las Vegas, NV (US)

( * ) Notice: Subject to any disclaimer, the term of this patent is extended or adjusted under 35 U.S.C. 154(b) by 259 days.

(21) Appl. No.: 11/513,492

(22) Filed: Aug. 31, 2006

(65) Prior Publication Data

US 2007/0047592 A1    Mar. 1, 2007

Related U.S. Application Data

(63) Continuation of application No. 09/863,888, filed on May 22, 2001, now abandoned.

(60) Provisional application No. 60/289,940, filed on May 9, 2001, provisional application No. 60/269,225, filed on Feb. 14, 2001.

(51) Int. Cl.
　　H04J 3/16　　(2006.01)
　　H04J 3/04　　(2006.01)
　　H04J 3/07　　(2006.01)
(52) U.S. Cl. .................. 370/466; 370/505; 370/536; 370/907
(58) Field of Classification Search ......... 370/465–466, 370/505, 535–537, 539–542
See application file for complete search history.

(56) References Cited

U.S. PATENT DOCUMENTS

| | | | |
|---|---|---|---|
| 4,061,577 A | 12/1977 | Bell | |
| 4,087,642 A | 5/1978 | Jessop et al. | |
| 4,210,779 A | 7/1980 | Simokat | |
| 4,264,973 A | 4/1981 | Hustig | |
| 4,520,346 A | 5/1985 | Shimada | |
| 4,701,904 A | 10/1987 | Darcie | |
| 4,704,715 A | 11/1987 | Shibagaki et al. | |
| 4,768,186 A | 8/1988 | Bodell | |
| 4,800,555 A | 1/1989 | Foschini | |
| 4,910,586 A | 3/1990 | Sharpe | |
| 4,953,156 A | 8/1990 | Olshansky et al. | |
| 5,001,711 A | 3/1991 | Obana et al. | |
| 5,040,170 A | 8/1991 | Upp et al. | |
| 5,056,118 A | 10/1991 | Sun | |
| 5,060,310 A | 10/1991 | Frisch et al. | |
| 5,075,792 A | 12/1991 | Brown et al. | |
| 5,166,890 A | 11/1992 | Smischny | |

(Continued)

FOREIGN PATENT DOCUMENTS

EP　　0 717 521　　6/1996

*Primary Examiner*—Seema S Rao
*Assistant Examiner*—Nittaya Juntima

(57) ABSTRACT

Method and system for providing data transmission with transparency over the Gigabit Ethernet data stream includes receiving the 10 bit code with a data rate of 1,250 Mbits/second from the encoded 8B/10B data and arbitrarily selecting 9 bit codes using a look-up translation table which can fully represent the 10 bit codes received. The translated 9 bit codes with a data rate of 1,125 Mbits/second is then provided to eight STS-3 inverse multiplexer which inverse multiplexes the received codes into eight STS-3 data streams each with a data rate of 155.52 Mbits/second plus an offset Δ which are then provided to the modem for transmission to the far end via the optical transmission path.

32 Claims, 12 Drawing Sheets

U.S. PATENT DOCUMENTS

| | | | |
|---|---|---|---|
| 5,339,184 A | 8/1994 | Tang | |
| 5,349,349 A | 9/1994 | Shimizume | |
| 5,349,588 A | 9/1994 | Schellinger | |
| 5,351,148 A | 9/1994 | Maeda et al. | |
| 5,387,927 A | 2/1995 | Look et al. | |
| 5,430,568 A | 7/1995 | Little et al. | |
| 5,459,607 A | 10/1995 | Fellows et al. | |
| 5,461,612 A | 10/1995 | Gockler et al. | |
| 5,559,561 A | 9/1996 | Wei | |
| 5,576,874 A | 11/1996 | Czerwiec et al. | |
| 5,590,316 A | 12/1996 | Hausauer | |
| 5,596,436 A | 1/1997 | Sargis et al. | |
| 5,610,748 A | 3/1997 | Sakanaka et al. | |
| 5,614,901 A | 3/1997 | Haas | |
| 5,678,198 A | 10/1997 | Lemson | |
| 5,680,238 A | 10/1997 | Masuda | |
| 5,714,904 A | 2/1998 | Jeong | |
| 5,757,297 A | 5/1998 | Ferraiolo et al. | |
| 5,757,871 A | 5/1998 | Furukawa et al. | |
| 5,761,424 A | 6/1998 | Adams et al. | |
| 5,805,632 A | 9/1998 | Leger | |
| 5,832,387 A | 11/1998 | Bae et al. | |
| 5,878,088 A | 3/1999 | Knutson et al. | |
| 5,938,309 A | 8/1999 | Taylor | |
| 5,946,355 A | 8/1999 | Baker | |
| 5,959,996 A | 9/1999 | Byers | |
| 6,014,708 A * | 1/2000 | Klish | 709/232 |
| 6,041,062 A | 3/2000 | Yamato et al. | |
| 6,055,242 A | 4/2000 | Doshi et al. | |
| 6,078,412 A | 6/2000 | Fuse et al. | |
| 6,097,435 A | 8/2000 | Stanger et al. | |
| 6,158,014 A | 12/2000 | Henson | |
| 6,160,649 A | 12/2000 | Horiuchi et al. | |
| 6,167,077 A | 12/2000 | Ducaroir et al. | |
| 6,236,726 B1 | 5/2001 | Darveau | |
| 6,246,348 B1 | 6/2001 | Moscatelli | |
| 6,271,942 B1 | 8/2001 | Sasai et al. | |
| 6,289,511 B1 | 9/2001 | Hubinette | |
| 6,346,895 B1 | 2/2002 | Lee et al. | |
| 6,430,148 B1 | 8/2002 | Ring | |
| 6,430,201 B1 | 8/2002 | Azizoglu et al. | |
| 6,470,032 B2 | 10/2002 | Dudziak et al. | |
| 6,529,303 B1 | 3/2003 | Rowan et al. | |
| 6,603,822 B2 | 8/2003 | Brede et al. | |
| 6,624,766 B1 | 9/2003 | Possley et al. | |
| 6,643,470 B1 | 11/2003 | Iida et al. | |
| 6,728,966 B1 | 4/2004 | Arsenault et al. | |
| 6,771,671 B1 | 8/2004 | Fields et al. | |
| 6,854,031 B1 | 2/2005 | Ouellet et al. | |
| 6,914,941 B1 | 7/2005 | Moshe et al. | |
| 6,965,619 B1 | 11/2005 | Bisson et al. | |
| 7,002,986 B1 | 2/2006 | Roberts | |
| 7,043,271 B1 | 5/2006 | Seto et al. | |
| 7,154,914 B1 | 12/2006 | Pechner et al. | |
| 7,227,844 B1 * | 6/2007 | Hall et al. | 370/242 |
| 2002/0039211 A1 * | 4/2002 | Shen et al. | 359/110 |
| 2002/0110157 A1 | 8/2002 | Jorgenson et al. | |

* cited by examiner

| A1 | BR | ID1 | R | R | R | R | R | R |
|----|-----|-----|---|---|---|---|---|---|
| A1 | BR1 | ID2 | R | R | R | R | R | R |
| A1 | R | ID3 | R | R | R | R | R | R |
| A2 | R | R | R | R | R | R | R | R |
| A2 | R | R | R | R | R | R | R | P1 |
| A2 | R | R | R | R | R | R | R | P1 |
| R | R | R | R | R | R | R | R | R |
| ANS | R | R | R | R | R | R | R | R |
| 2R | 2R | 2R | 2R | 2R | 2R | 2R | 2R | 2R |
| 3 BIP-8 | 3R | 3R | 3R | 3R | 3R | 3R | 3R | 3R |
| 3 R1 | 3 R1 | 3 R1 | 3 R1 | 3 R1 | 3 R1 | 3 R1 | 3 R1 | 3 R1 |
| 109 I | 109 I | 109 I | 109 I | 109 I | 109 I | 109 I | 109 I | 109 I |
| 3 R1 | 3 R1 | 3 R1 | 3 R1 | 3 R1 | 3 R1 | 3 R1 | 3 R1 | 3 R1 |
| 5R | 5R | 5R | 5R | 5R | 5R | 5R | 5R | 5R |
| 108 I | 108 I | 108 I | 108 I | 108 I | 108 I | 108 I | 108 I | 108 I |
| R1 | R1 | R1 | R1 | R1 | R1 | R1 | R1 | P |

*FIG. 5*

| A1 | A1 | A2 | A2 | A2 | R | R | ANS | 2R | 3 BIP-8 | 95 I1 | 7R | 14 R2 | 89 I1 | R2 | R2 |
|---|---|---|---|---|---|---|---|---|---|---|---|---|---|---|---|
| BR | BR1 | ID2 | R | R | R | R | R | 2R | 3R | 95 I1 | 7R | 14 R2 | 89 I1 | R2 | R2 |
| ID1 | R | ID3 | R | R | R | R | R | 2R | 3R | 95 I1 | 7R | 14 R2 | 89 I1 | R2 | R2 |
| R | R | R | R | R | R | R | R | 2R | 3R | 95 I1 | 7R | 14 R2 | 89 I1 | R2 | R2 |
| R | R | R | R | R | R | R | R | 2R | 3R | 95 I1 | 7R | 14 R2 | 89 I1 | R2 | R2 |
| R | R | R | R | R | R | R | R | 2R | 3R | 95 I1 | 7R | 14 R2 | 89 I1 | R2 | R2 |
| R | R | R | R | PI1 | R | R | R | 2R | 3R | 95 I1 | 7R | 14 R2 | 89 I1 | I1 | R2 |
| R | R | R | PI1 | PI1 | R | R | R | 2R | 3R | 95 I1 | 7R | 14 R2 | 89 I1 | I1 | R2 |
| R | R | R | R | R | R | R | R | 2R | 3R | 95 I1 | 7R | 14 R2 | 89 I1 | I1 | P1 |

FIG. 6

| A1 | A1 | A1 | A2 | A2 | A2 | R | ANS | 2R | 3 BIP-8 | 98 12 | 7R | 2 R2 | 98 12 | R2 | R2 |
|---|---|---|---|---|---|---|---|---|---|---|---|---|---|---|---|
| BR | BR1 | R | R | R | R | R | R | 2R | 3R | 98 12 | 7R | 2 R2 | 98 12 | R2 | R2 |
| ID1 | ID2 | ID3 | R | R | R | R | R | 2R | 3R | 98 12 | 7R | 2 R2 | 98 12 | R2 | R2 |
| R | R | R | R | R | R | R | R | 2R | 3R | 98 12 | 7R | 2 R2 | 98 12 | R2 | R2 |
| R | R | R | R | R | R | R | R | 2R | 3R | 98 12 | 7R | 2 R2 | 98 12 | R2 | R2 |
| R | R | R | R | R | R | R | R | 2R | 3R | 98 12 | 7R | 2 R2 | 98 12 | R2 | R2 |
| R | R | R | R | R | R | R | R | 2R | 3R | 98 12 | 7R | 2 R2 | 98 12 | R2 | R2 |
| R | R | R | R | PI1 | PI1 | R | R | 2R | 3R | 98 12 | 7R | 2 R2 | 98 12 | R2 | R2 |
| R | R | R | R | | | | | | | | | | | I2 | P1 |

| BYTE | DEFINITION | VALUE |
|---|---|---|
| A1 | Framing byte | 0xF6 |
| A2 | Framing byte | 0x28 |
| BIP-8 | BIP-8 per STS-1 as defined in GR-253 | N/A |
| BR | Bit Rate ID byte | First 8-bit byte of bit rate code that corresponds to a software defined bitrate. Bit rates should include: Fibre Channel, Gig-E, 1130 RZ, 565 RZ, Unavailable. |
| BRI | Bit Rate ID byte | Second 8-bit byte of bit rate code that corresponds to a software defined bitrate. Bit rates should include: Fibre Channel, Gig-E, 1130 RZ, 565 RZ, Unavailable. |
| ID1 | Frame identification byte | Least significant 6 bits correspond to the most significant 6 bits of the 14-bit ID code. |
| ID2 | Frame identification byte | Least significant 8 bits of the 14 bit ID code. |
| ID3 | Frame identification byte | Least significant 3 bits correspond to STS# 0 through 7. |
| R | 8 bit fixed stuff | 0xFF |
| R1 | 9 bit fixed stuff | 0x1FF |
| R2 | 10 bit fixed stuff | 0x3FF |
| I | 9 bit data | N/A |
| I1 | Fibre Channel 10 bit data | N/A |
| I2 | VRH-RZ 10 bit data | For 1129.84 Mb/s, I2=iiiiiiiiii (i=information bit) For 564.92 Mb/s, I2=11111iiiii |
| PI | P stuff byte indication. Stuffing used to prevent FIFO overflows | 0xFF => P byte = R1, 0x00 => P byte = I |
| PI1 | P1 stuff byte indication. Stuffing used to prevent FIFO overflows | 0xFF => P1 byte = R2, 0x00 => P1 byte = I1 |
| P | 9-bit stuff | I or R1 dependent on STS #. P shall need to be I when needed to prevent a FIFO overflow; otherwise, it's R1. |
| P1 | 10-bit stuff | I1 or R2 dependent on STS #. P1 shall need to be I1 when needed to prevent a FIFO overflow; otherwise, it's R2. |
| ANS | Alarm Notification Signal byte | 0x00 => normal, 0xFF => alarm |

FIG. 8

*VRVH pseudo STS-3 Frame*

| A1 | A1 | A1 | A2 | A2 | A2 | R | ANS | 2R | 3 BIP-8 | (X) I(n) | (D) R(a) | (E) R(b) | (Y) I(n) | R(b) | R(b) |
|---|---|---|---|---|---|---|---|---|---|---|---|---|---|---|---|
| BR | BR1 | R | R | R | R | R | R | 2R | 3R | (X) I(n) | (D) R(a) | (E) R(b) | (Y) I(n) | R(b) | R(b) |
| ID1 | ID2 | ID3 | R | R | R | R | R | 2R | 3R | (X) I(n) | (D) R(a) | (E) R(b) | (Y) I(n) | R(b) | R(b) |
| R | R | R | R | R | R | R | R | 2R | 3R | (X) I(n) | (D) R(a) | (E) R(b) | (Y) I(n) | R(b) | R(b) |
| R | R | R | R | R | R | R | R | 2R | 3R | (X) I(n) | (D) R(a) | (E) R(b) | (Y) I(n) | (V)R(b) or (!V)I(n) | R(b) |
| R | R | R | R | R | R | R | R | 2R | 3R | (X) I(n) | (D) R(a) | (E) R(b) | (Y) I(n) | (K)R(b) or (!K)I(n) | R(b) |
| R | R | R | R | R | R | R | R | 2R | 3R | (X) I(n) | (D) R(a) | (E) R(b) | (Y) I(n) | (H)R(b) or (!H)I(n) | R(b) |
| R | R | R | R | R | R | R | R | 2R | 3R | (X) I(n) | (D) R(a) | (E) R(b) | (Y) I(n) | (G)R(b) or (!G)I(n) | R(b) |
| R | R | R | R | PI(d) | PI(d) | R | R | 2R | 3R | (X) I(n) | (D) R(a) | (E) R(b) | (Y) I(n) | (S)R(b) or (!S)I(n) | P(d) |

*FIG. 9*

Configuration Parameters for each date rate

| Parameter | Gigabit Ethernet | Fibre Channel | 1.129984 Gbps | 1.114112 Gbps |
|---|---|---|---|---|
| X | 109 | 95 | 98 | 97 |
| n | 0 | 1 | 2 | 2 |
| D | 5 | 7 | 7 | 2 |
| a | 0 | 0 | 0 | 0 |
| E | 5 | 14 | 2 | 9 |
| b | 1 | 2 | 2 | 2 |
| Y | 108 | 89 | 98 | 96 |
| d | 0 | 1 | 1 | 1 |
| V | 1 | 1 | 1 | 1 |
| K | 1 | 0 | 1 | 1 |
| H | 1 | 0 | 1 | 0 |
| G | 1 | 0 | 1 | 0 |
| S | 1 | 0 | 0 | 0 |

*FIG. 10*

*Frame byte definitions*

| BYTE | DEFINITION | VALUE |
|---|---|---|
| A1 | Framing byte | 0xF6 |
| A2 | Framing byte | 0x28 |
| BIP-8 | BIP-8 per STS-1 as defined in GR-253 | N/A |
| BR(1) | Bit Rate ID byte | 16-bits correspond to a software defined bitrate. Bitrates should include: Fibre Channel, Gig-E, 1130 RZ, Unavailable |
| ID1 | Frame identification byte | Least significant 6 bits correspond to the most significant 6 bits of the 14-bit ID code. |
| ID2 | Frame identification byte | Least significant 8 bits of the 14 bit ID code. |
| ID3 | Frame identification byte | Least significant 3 bits correspond to STS# 0 through 7. |
| R(0) | 8 bit fixed stuff | 0xFF |
| R(1) | 9 bit fixed stuff | 0x1FF |
| R(2) | 10 bit fixed stuff | 0x3FF |
| I(0) | 9 bit data | N/A |
| I(1) | Fibre Channel 10 bit data | N/A |
| I(2) | VRH-RZ 10 bit data | For 1129.84 Mb/s, I2=iiiiiiiiii (i=information bit) For 564.92 Mb/s, I2=11111iiiii |
| PI(0) | P stuff byte indication. Stuffing used to prevent FIFO overflows | 0xFF => P byte = R1, 0x00 => P byte = I |
| PI(1) | P1 stuff byte indication. Stuffing used to prevent FIFO overflows | 0xFF => P1 byte = R2, 0x00 => P1 byte = I1 |
| P(0) | 9-bit stuff | I or R1 dependent on STS #. P shall need to be I when needed to prevent a FIFO overflow; otherwise, it's R1. |
| P(1) | 10-bit stuff | I1 or R2 dependent on STS #. P1 shall need to be I1 when needed to prevent a FIFO overflow; otherwise, it's R2. |
| ANS | Alarm Notification Signal byte | 0x00 => normal, 0xFF => alarm |

*FIG. 11*

METHOD AND APPARATUS FOR PROVIDING A GIGABIT ETHERNET CIRCUIT PACK

RELATED APPLICATION

This application is a continuation of U.S. patent application Ser. No. 09/863,888 filed May 22, 2001, now abandoned, which claims priority to Provisional Patent Application No. 60/269,225, filed Feb. 14, 2001, and to Provisional Patent Application No. 60/289,940, filed May 9, 2001, the disclosures of each of is incorporated herein by reference for all purposes.

BACKGROUND OF THE INVENTION

1. Field of the Invention

The present invention relates to data network systems. In particular, the present invention relates to method and apparatus for providing transparently transporting 155 Mb/s signals through a high speed data network.

2. Description of the Related Art

Optical fiber is a transmission medium that is well suited to meet the increasing demand in data transmission in communication networks. Generally, optical fiber has a much greater bandwidth than metal-based transmission medium such as twisted copper pair or coaxial cable, and protocols such as the OC protocol have been developed for the transmission of data over optical fibers. Typical communications system based on optical fibers include a transmitter, an optical fiber, and a receiver. The transmitter converts the data to be transported into an optical form using the proper protocol and then transmits the resulting optical signal over the optical fiber to the receiver, where the original data is recovered from the optical signal.

While adding more optical fiber to the existing communications network infrastructure is a costly option to meet the increasing demand for communication bandwidth, in some locations, expanding the existing network may not be a viable alternative. Additionally, given the high cost of installation and the extensive amount of time required, adding more optical fiber is not always an attractive option to increase communications bandwidth.

Due to the large bandwidth capability of optical fibers, this type of transmission medium is most efficiently utilized when multiple users share the medium. In general, a number of low-speed data streams ("low speed channels") transmitted by different users may be combined into a single high-speed channel for transporting across the optical fiber medium. At the opposite end of the communications network, when the high-speed channel reaches the destination for one of the low-speed channels that it is transporting, the low-speed channel must be extracted from the high-speed channel.

A typical optical communications network includes nodes (for example, central offices) which transmit high-speed channels to each other over optical fibers. In addition to transporting low-speed channels through the nodes (commonly referred to as the "pass-through" function) as part of high-speed channels passing through the nodes, nodes may also combine incoming low-speed channels to the high-speed channel (i.e., the "add" function) and/or extract outgoing low-speed channels from the high-speed channels (the "drop" function). These functions are commonly referred to as add-drop multiplexing (ADM).

For example, wavelength division multiplexing (WDM) and time division multiplexing (TDM) are two known approaches to combining low-speed channels into a high-speed channel. In WDM and its counterpart dense wavelength division multiplexing (DWDM), each low-speed channel is placed on an optical carrier of a different wavelength and the different wavelength carriers are combined to form the high-speed channel. Crosstalk between the low-speed channels is a significant concern in WDM, and thus the wavelengths for the optical carriers must be spaced sufficiently far apart (typically 50 GHz or more) so that the different low-speed channels are resolvable.

In TDM, each low-speed channel is compressed into a certain time slot and the time slots are then combined on a time basis to form the high-speed channel. For example, given a certain period of time, the high-speed channel may be capable of transporting 10 bits while each low-speed channel may only be capable of transmitting 1 bit. In this case, the first bit of the high-speed channel may be allocated to low-speed channel 1, the second bit to low-speed channel 2, and so on, thus forming a high-speed channel containing 10 low-speed channels. Generally, TDM requires precise synchronization of the different channels on a bit-by-bit basis (or byte-by-byte basis, in the case of SONET), and a memory buffer is typically also required to temporarily store data from the low-speed channels.

SUMMARY OF THE INVENTION

In view of the foregoing, a method of transporting data through a data network, in accordance with one embodiment of the present invention includes the steps of receiving an encoded data, mapping the received data to a predetermined data; and multiplexing the mapped predetermined data.

In particular, the encoded data may be an 8B/10B encoded data which includes either a Gigabit Ethernet data and a Fiber Channel data.

The receiving step may further include the step of determining a data rate of the received encoded data, and the step of recovering a clock signal from the received encoded data.

The clock signal may have a rate one tenth of said data rate, where the predetermined data may include a 9-bit data. In turn, the 9-bit data may include one of an arbitrary set of 9-bit data.

The multiplexing step may include the step of synchronizing the multiplexed predetermined data, where the multiplexed predetermined data may be synchronized to a predetermined clock signal, and further, where the predetermined clock signal may include a phase locked loop clock signal.

An apparatus for providing data transport through a data network in accordance with another embodiment of the present invention includes a clock recovery unit configured to receive an encoded data, a data translation unit coupled to the clock recovery unit, configured to translate the received data to a predetermined data, and an inverse multiplexer coupled to the data translation unit, configured to inverse multiplex the translated predetermined data.

The encoded data may include 8B/10B encoded data, and in particular, one of a Gigabit Ethernet data and a Fiber Channel data.

The clock recovery unit may additionally detect a data rate of the received encoded data, and further, the clock recovery unit may be further configured to recover a clock signal from the received encoded data.

The clock signal may have a rate one tenth of said data rate.

Additionally, the predetermined data may include a 9-bit data, where the 9-bit data may include one of an arbitrary set of 9-bit data.

The inverse multiplexer may be further configured to synchronize the multiplexed predetermined data to a predetermined clock signal, where the predetermined clock signal may include a phase locked loop clock signal.

Additionally, a modem may be coupled to the inverse multiplexer to receive the inverse multiplexed translated predetermined data for transmission.

The inverse multiplexed translated predetermined data may include a plurality of STS-3 signals, where the plurality of STS-3 signals may include eight STS-3 signals for transmission.

An apparatus for providing data transport in a network in accordance with yet another embodiment of the present invention includes a demultiplexer configured to demultiplex received data, a data translation unit coupled to the multiplexer configured to translate the demultiplexed data to a predetermined data, and a serializer coupled to the data translation unit configured to receive the translated predetermined data and accordingly to generate a corresponding encoded data.

The received data may include a plurality of STS-3 signals, where the plurality of STS-3 signals may include eight STS-3 signals.

Additionally, a plurality of FIFOs may be provided, each configured to frame align the STS-3 signals, the frame aligned STS-3 signals corresponding to the received signal.

The demultiplexed data may include a 9-bit data, where the 9-bit data may have a data rate of 1,125 Mbits/second.

The demultiplexer may be further configured to perform parity checks on the received data.

The predetermined data may include a 10-bit data.

The serializer may be configured to synchronize the translated predetermined data, where the translated predetermined data may include a 10-bit data, and further, where the 10-bit data may have a data rate of 1,250 Mbits/second.

The encoded data may include an 8B/10B encoded data.

A method for providing data transport in a network in accordance with still another embodiment of the present invention includes the steps of demultiplexing a received data, translating the demultiplexed data to a predetermined data, generating a corresponding encoded data based on the translated predetermined data.

The received data may include a plurality of STS-3 signals, where the plurality of STS-3 signals may include eight STS-3 signals.

The method may further include the step of frame aligning each of the STS-3 signals, the frame aligned STS-3 signals corresponding to the received data for demultiplexing.

The demultiplexed data may include a 9-bit data, where the 9-bit data may have a data rate of 1,125 Mbits/second.

Additionally, the method above may further include the step of performing parity checks on the received data, as well as the step of synchronizing the translated predetermined data.

The translated predetermined data may include a 10-bit data, where the 10-bit data may have a data rate of 1,250 Mbits/second.

Finally, the encoded data may include an 8B/10B encoded data.

In the manner described, the present invention discloses method and system for providing data transmission with transparency over the Gigabit Ethernet as well as other data stream which includes receiving the 10 bit code with a data rate of 1,250 Mbits/second from the encoded 8B/10B data and arbitrarily selecting 9 bit codes using a look-up translation table which can fully represent the 10 bit codes received. The translated 9 bit codes with a data rate of 1,125 Mbits/second is then provided to eight STS-3 inverse multiplexer which inverse multiplexes the received codes into eight STS-3 data streams each with a data ate of 155.52 Mbits/second which are then provided to the modulator at the near end and demodulator at the far end.

These and other features and advantages of the present invention will be understood upon consideration of the following detailed description of the invention and the accompanying drawings.

BRIEF DESCRIPTION OF THE DRAWINGS

FIG. 5 is a tabular illustration of a pseudo STS-3 frame for use in multiplexing Gigabit ethernet data in the overall system shown in FIGS. 1-4.

FIG. 6 is a tabular illustration of a pseudo STS-3 frame for use in multiplexing Fiber channel data.

FIG. 7 is a tabular illustration of a pseudo STS-3 frame for use in multiplexing RZ data.

FIG. 8 illustrates frame byte definitions for pseudo STS-3 frames shown in FIGS. 5-7.

FIG. 9 illustrates a pseudo STS-3 configurable frame that can multiplex data at any rate in accordance with another embodiment of the present invention.

FIG. 10 illustrates a table showing the configuration parameters for each data rate for the configurable frame of FIG. 9.

FIG. 11 illustrates frame byte definitions for the configurable frame of FIG. 9.

DETAILED DESCRIPTION OF THE PREFERRED EMBODIMENT

Figure 1:
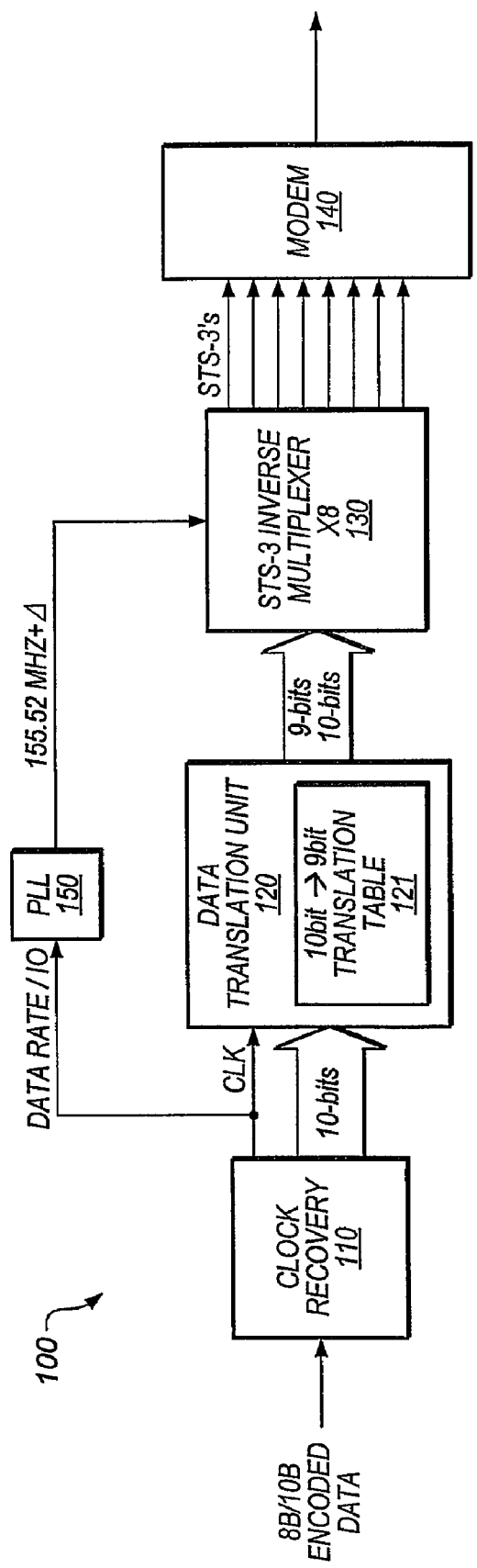
FIG. 1 illustrates an overall system in the add direction in accordance with one embodiment of the present invention.

FIG. 1 illustrates an overall system in the add direction in accordance with one embodiment of the present invention. Referring to FIG. 1, in the overall system 100, there is provided a clock recovery unit 110, a data translation unit 120, an STS-3 inverse multiplexer 130, and a phase-lock loop (PLL) unit 150. Furthermore, the data translation unit 120 includes a 10 bit-to-9 bit translation table 121. In one aspect of the present invention, 8B/10B encoded data is provided to the clock recovery unit 110. For example, both Gigabit Ethernet and Fiber Channel signals are encoded using the 8B/10B encoding scheme. In particular, under this coding scheme, 8 data bits are translated into 10 bits for the purpose of transition density of data for the clock recoveries and parity information for additional error detection.

Referring back to FIG. 1, in one embodiment, the clock recovery unit 110 is configured to recover clock signals from the received encoded data and to provide the recovered clock signal to the data translation unit 120 and the PLL unit 150. Moreover, the clock recovery unit 110 is also configured to provide the 10-bit data with a data rate of 1,250 Mbits/second to the data translation unit 120. As shown, the clock signal from the clock recovery unit 110 in one embodiment may be at a tenth of the data rate of the encoded data received. Moreover, in one aspect of the present invention, the clock recovery unit 110 may be configured to receive the 8B/10B encoded data without a clock signal, and to derive a clock signal using a phase lock loop (PLL) within the clock recovery unit 110. The derived clock signal may then be used in the digital components of the overall system 100 to sample and process the data. Indeed, in one aspect, the PLL unit 150 may be configured to frequency translate the incoming clock frequency to a predetermined frequency to derive a synchronous 155.52 MHz OC-3 clock that may be used to interface with the system 100.

As further shown, the data translation unit 120 is configured to translate the received 10-bit data to a corresponding 9-bit data. In particular, the system 100 queries the translation table 121 to determine the 9-bit data corresponding to the received 10-bit data. In one aspect of the present invention, the 10-bit to 9-bit translation table 121 of the data translation unit 120 may include 464 unique 9-bit codes, each corresponding to a separate one of the received 10-bit data. Moreover, the 9-bit codes may be arbitrarily chosen. Additionally, as shown in the Figure, 10 bit data received from clock recovery unit 110 which do not require translation is passed through the data translation unit 120 which uses the translation table 121 to determine whether the received data bit code is valid, and outputs the valid confirmed 10 bit data to the 8×STS-3 inverse multiplexer 130.

Furthermore, as will be discussed below, any 10-bit data received which does not map to one of the 464 9-bit codes in the translation table 121 may result in a /V/ code translation indicating an error. It should be noted that /V/ codes are 10-bit codes defined by IEEE to be used for error propagation. In particular, /V/ codes are inserted as data in the STS-3 frame when a LOSYN defect or LOS defect exists on the add direction input. In particular, in the case of Gigabit Ethernet or Fiber Channel data streams, for a LOSYN defect, as soon as a comma is detected, the /V/ code insertion ceases.

The translated 9-bit data with a data rate of 1,125 Mbits/second is provided to the inverse multiplexer 130 which, along with the phase lock looped clock signal from the PLL unit 150, inverse multiplexes the received 9-bit data into corresponding STS-3 signals. In one aspect, the phase lock looped clock signal from the PLL unit 150 is at 155.52 MHz with an offset Δ, where the offset Δ is a 20 ppm (parts per million) or less offset. Indeed, with the incoming bit data determined, the PLL unit 150 locks onto the incoming data rate. An ADD PLL alarm may be configured to indicate the status of the PLL unit 150—whether the PLL unit 150 is in locked or unlocked state. This permits the overall system to maintain the timing on the clock instead of the data. Furthermore, in another embodiment, variable bit stuffing may be implemented as will be discussed in further detail below. With both cases, since the add direction clock signal is locked onto the incoming data, the data will fit exactly into the data frames shown in FIGS. 5-7 discussed in further detail below.

Moreover, in addition to inverse multiplexing the 9-bit data into eight STS-3 signals, the inverse multiplexer 130 is further configured to provide variable byte stuffing. Then, the eight STS-3 signals, each at a data rate of 155.52 Mbits/second+offset .DELTA. with all eight STS-3 signals synchronized and frame aligned, are provided to a modem 140 for transmission via the optical transmission line to the drop side. In particular, the modem 140 includes eight modulators one for each STS-3 signal output from the STS-3 inverse multiplexer 130. More specifically, each of the eight modulators together comprising the modem 140 is similar to modulator as described in pending U.S. patent application Ser. No. 09/571,349, filed May 16, 2000, now abandoned, by inventors David A. Pechner and Laurence J. Newell entitled "Through-Timing of Data Transmitted Across an Optical Communications System Utilizing Frequency Division Multiplexing" assigned to the assignor of the present application, and the disclosure of which is incorporated herein by reference for all purposes.

As discussed above, in accordance with one embodiment of the present invention, 8B/10B encoded data which includes, for example, Gigabit Ethernet and Fiber Channel signals, may be fully represented by 9 bits and may be transported transparently to ensure that parity and special code functions are passed on to the customers. Furthermore, in one aspect of the present invention, the PLL unit 150 and the clock recovery unit 110 may be configured to permit the overall system 100 to "tune" to each of the signal rates, such as, for example, in the case of Gigabit Ethernet data whose rate is approximately 1,250 Mb/s encoded and approximately 1,000 Mb/s decoded.

Figure 2:
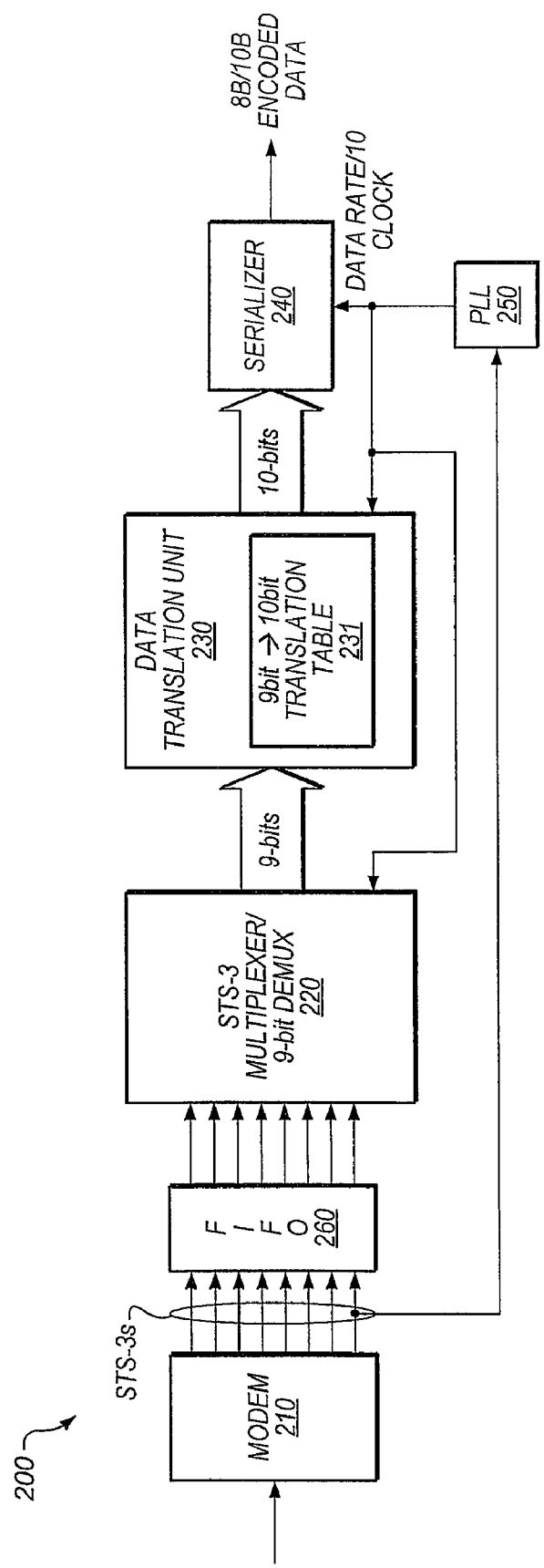
FIG. 2 illustrates the overall system shown in FIG. 1 in the drop direction in accordance with one embodiment of the present invention.

FIG. 2 illustrates the overall system shown in FIG. 1 in the drop direction in accordance with one embodiment of the present invention. Referring to FIG. 2, there is provided STS-3 multiplexer/9-bit demultiplexer 220 which is configured to receive eight STS-3 signals from modem 210. The modem 210 is similar to the modem 140 described above in FIG. 1 in the add direction of the communication path. Further shown in FIG. 2 is a data translation unit 230 coupled to the STS-3 multiplexer/9-bit demultiplexer 220, as well as a phase lock loop (PLL) unit 250 and a serializer 240. The serializer 240 may be provided with translated 10 bit data from the data translation unit 230 along with phase lock looped clock signal from the PLL unit 250 to regenerate the 8B/10B encoded data. Coupled between the modem 210 and the STS-3 multiplexer/9-bit demultiplexer 220 is a FIFO 260 which is configured to receive the eight STS-3s for frame aligning. In particular, under the control of a frame aligning state machine, FIFO 260 which in one embodiment includes eight separate FIFOs for each of the received STS-3s, is configured to frame align each received STS-3s to line up the STS-3s which are received from the modem 210 with slight delay.

In particular, in accordance with one aspect of the present invention, the STS-3 multiplexer/9-bit demultiplexer 220 may be configured to perform parity checks and to demultiplex the 9 bits from the received eight STS-3 signals. The recovered 9-bit data with a data rate of 1,125 Mbits/second is then provided to the data translation unit 230 which includes a 9-bit-to-10-bit translation table 231. In one embodiment, the system 200 may be configured to retrieve a corresponding 10-bit data for the recovered, received 9-bit data from the STS-3 multiplexer/9-bit demultiplexer. As will be discussed in further detail below, in one embodiment, the 9-bit to 10-bit translation table 231 of the data translation unit 230 may be a look-up table stored in the data translation unit 230 under the control of a controller (not shown) of the data translation unit 230. In particular, the translation table 231 may be, in one embodiment, stored in a storage unit within the data translation unit 230, where the storage unit may include a memory such as a random access memory.

Referring back to FIG. 2, the PLL unit 250 is configured to receive a 19.44 MHz clock signal from the STS-3 signal transmission from the modem 210, and is configured to recover a clock signal at a tenth of the data rate to provide the clock signal to the serializer 240, as well as to the data translation unit 230 and the STS-3 Multiplxer/9-bit demultiplexer 220. As discussed above, the serializer 240 is configured to synchronize the translated 10-bit data with a data rate of 1,250 Mbits/second received from the data translation unit 230 with the clock signal received from the PLL unit 250 and to regenerate the 8B/10B encoded data. In this manner, in accordance with one embodiment of the present invention, in the drop direction, the 8B/10B encoded data may be recovered from the received eight STS-3 signals.

Figure 3:
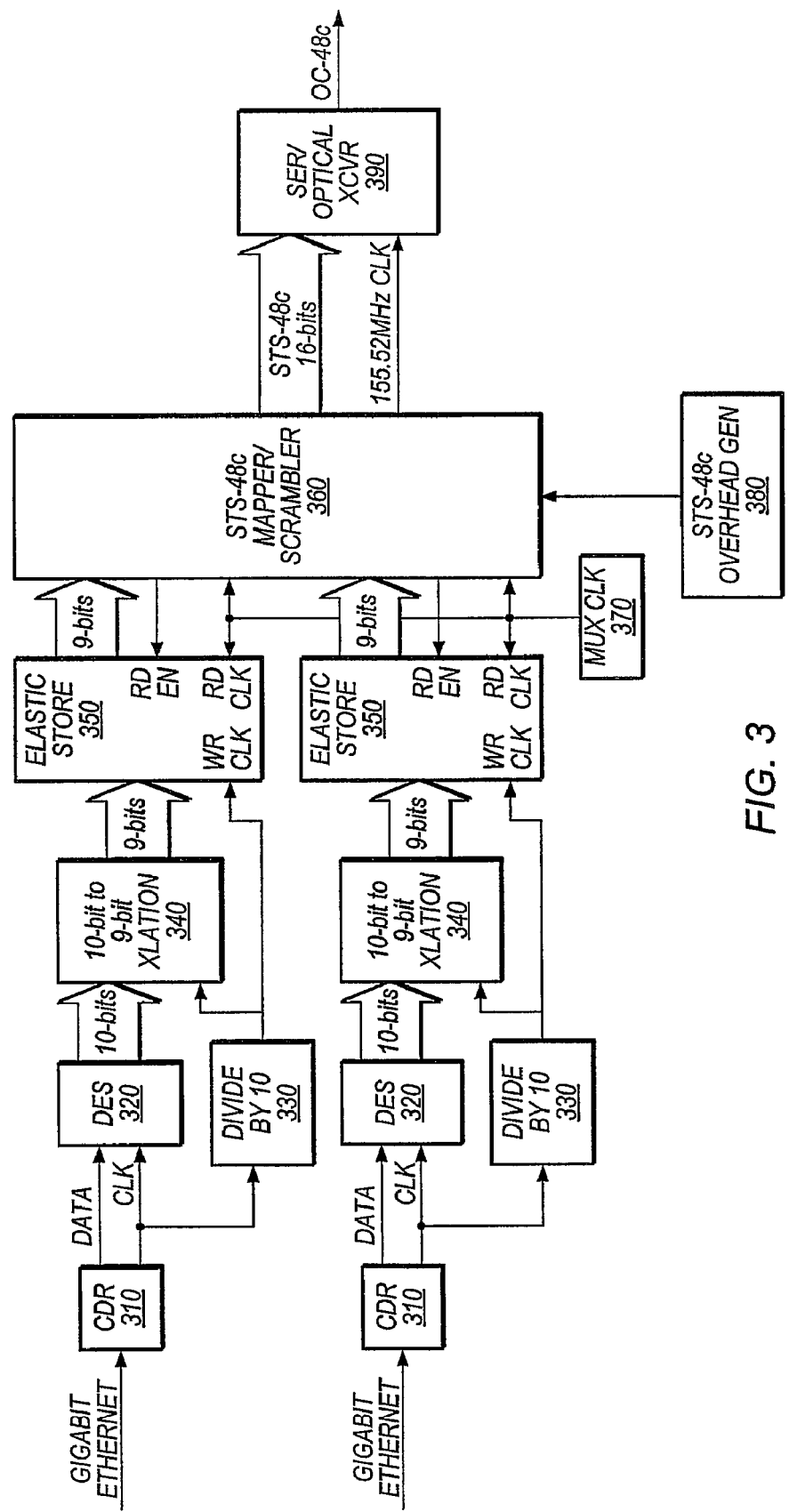
FIG. 3 illustrates an overall system configured for transporting OC-48 optical signals in the add direction in accordance with one embodiment of the present invention.

FIG. 3 illustrates an overall system configured for transporting OC-48 optical signals in the add direction in accordance with one embodiment of the present invention. Referring to FIG. 3, there is provided a pair of Clock and Data Recovery (CDRs) 310 each configured to receive Gigabit ethernet data. Also shown in FIG. 3 are Deserializer (DES) 320 configured to receive the data and the clock signal from the corresponding CDR 310 and output a 10-bit data each. The clock signal from the CDR 310 is also provided to the divider 330 which is configured to divide the clock signal from the CDR 310 by a factor of 10. The 10-bit data from the DES 320 is provided to the 10-bit to 9-bit translation unit 340 which is configured to translate the 10-bit data received from the DES 320 into a respective corresponding 9-bit data. The 9-bit data from each 10-bit to 9-bit translation unit 340 is then provided to the elastic store unit 350. The elastic store 350 in one embodiment is configured to perform buffering of the data during the time the multiplexer is transmitting frame overhead or bit stuffing.

As further shown in FIG. 3, the clock signal divided by the divider 330 is provided to the 10-bit to 9-bit translation unit 340 as well as to the elastic store unit 350. The 9-bit data from the elastic store unit 350 is provided to STS-48c Mapper/Scrambler 360 which is also configured to receive a clock signal from the multiplexer clock 370. As further shown, the multiplexer clock is also provided to each elastic store units 350. Additionally, the STS-48c Mapper/Scrambler 360 is also configured to receive overhead data from the STS-48c overhead generator 380 as well as a 155.52 MHz clock signal. The 16-bit STS-48c data output from the STS-48c Mapper/Scrambler 360 is then provided to serializer/optical transceiver 390 which is then configured to transmit OC-48c data to the remote side.

Figure 4:
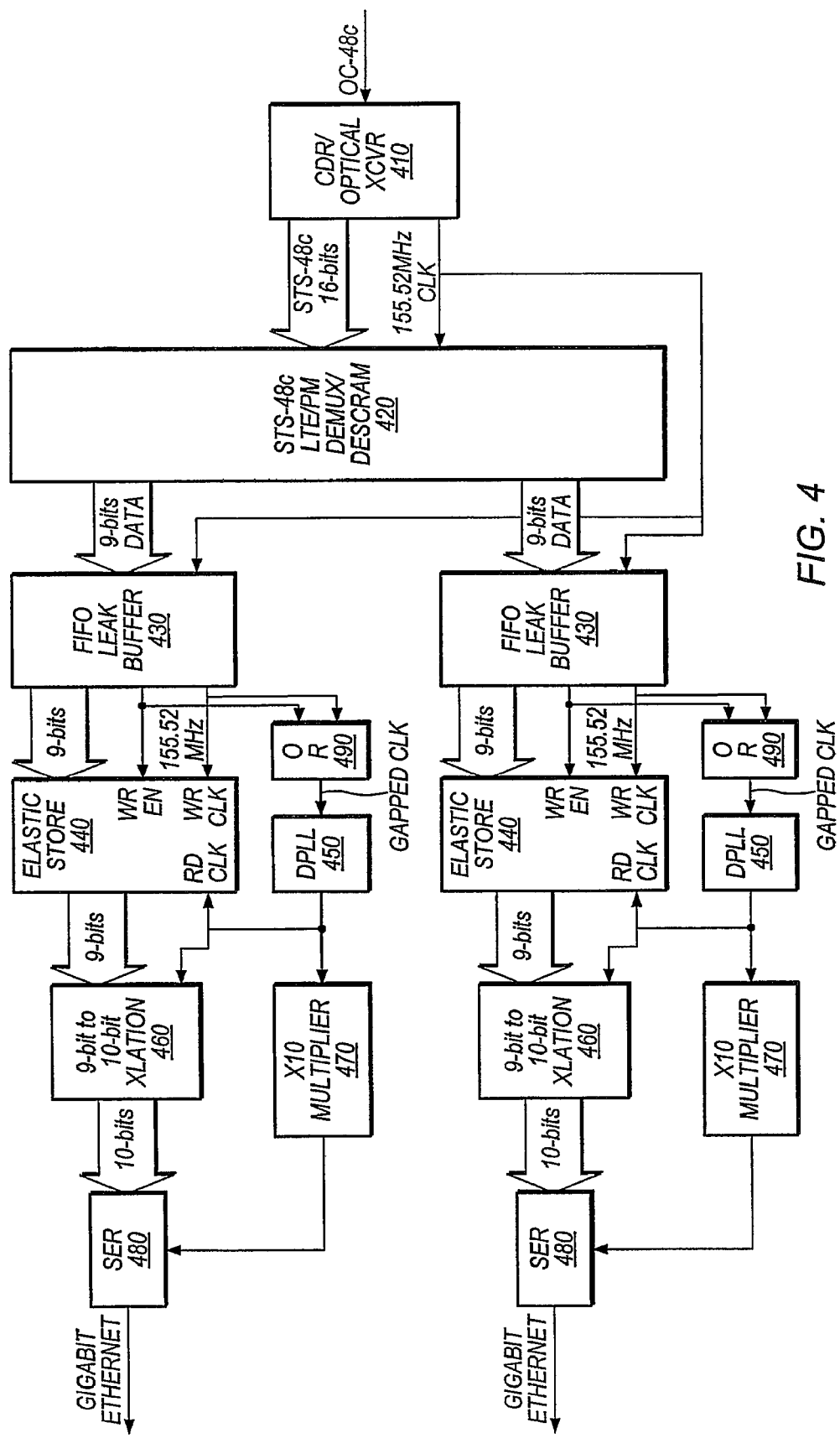
FIG. 4 illustrates the overall system shown in FIG. 3 in the drop direction in accordance with one embodiment of the present invention.

FIG. 4 illustrates the overall system shown in FIG. 3 in the drop direction in accordance with one embodiment of the present invention. Referring to FIG. 4, OC-48c signal is received by CDR/Optical transceiver 410 which is configured to output 16-bit STS-48c data to the STS-48c LTE/PM Demultiplexer/descrambler 420. The CDR/optical transceiver 410 is also configured to transmit a 155.52 MHz clock signal to the STS-48c LTE/PM Demultiplexer/descrambler 420. The 9-bit data output from the STS-48c LTE/PM Demultiplexer/descrambler 420 is provided to respective FIFO leak buffer 430. The FIFO leak buffer 430 are also configured to receive the 155.52 MHz clock signal from the CDR/optical transceiver 410.

The frame aligned 9-bit data from the respective FIFO leak buffer 430 is the provided to the respective elastic store units 440. More particularly, the FIFO leak buffer 430 is configured to send the 155.52 clock signal in addition to the 9-bit data. The elastic store unit 440 is also configured to receive the 9-bit data from the FIFO leak buffer 430. The 155.52 MHz clock signal from the FIFO leak buffer 430 is also provided to the respective elastic store units 440 as well as to a logical OR 490.

Referring back to FIG. 4, as can be seen, the output of the O R 490 which is a gapped clock signal, is provided to the dynamic phase locked loop (DPLL) 450 whose output is provided to the elastic store unit 440, the 9-bit to 10-bit translation unit 460 and to the PLL multiplier 470. The multiplication factor for the PLL multiplier 470 may in one embodiment include ten. As can be further seen from FIG. 4, the 9-bit data provided from the elastic store unit 440 to the 9-bit to 10-bit translation unit 460 is translated and output as a corresponding 10-bit data. The 10-bit data from the 9-bit to 10-bit translation unit 460 as well as the output from the PLL multiplier 470 is provided to the SER 480 which is configured to output gigabit ethernet data from the received information. In this manner, in accordance with one embodiment of the present invention, in the drop direction of a data transmission scheme, the data may be transported transparently in the data network.

FIG. 5 is a tabular illustration of a pseudo STS-3 frame for use in multiplexing Gigabit ethernet data in the overall system shown in FIGS. 1-4. Referring to FIG. 5, as can be seen, the Gigabit ethernet data pseudo STS-3 frame table 500 substantially corresponds to the STS-3 inverse multiplexer 130 of the overall system 100 shown in FIG. 1. Indeed, as shown, each of the eight sets of 9-bit codes is multiplexed into a pseudo STS-3 frame as shown in the Gigabit ethernet data pseudo STS-3 frame table 500. As can be seen from FIG. 5, the number of bits in each row of the Gigabit ethernet data pseudo STS-3 frame table 500 is equivalent to the number of bits in a row of an STS-3 signal since it has to run at the same data rate. The byte definition for each entry in the Gigabit ethernet data pseudo STS-3 frame table 500 can be seen in FIG. 8 which will be discussed in further detail below.

FIG. 6 is a tabular illustration of a pseudo STS-3 frame for use in multiplexing fiber channel data. Referring to FIG. 6, as can be seen, the fiber channel data pseudo STS-3 frame table 600 substantially corresponds to the STS-3 inverse multiplexer 130 of the overall system 100 shown in FIG. 1. In particular, the fiber channel data pseudo STS-3 frame table 600 of FIG. 6 illustrates the pseudo STS-3 frame in the case of Fiber Channel signals. In particular, if the data is Fiber Channel data, the 10-bit codes are passed through with no translation since the data rate is much less as compared with the case where the data is Gigabit Ethernet. Indeed, the 10-bit codes are inverse multiplexed into eight sets of 10-bit codes and multiplexed in to the pseudo STS-3 frame of FIG. 6. Again, the byte definition for each entry in the translation table 600 of FIG. 6 can be seen in FIG. 8.

FIG. 7 is a tabular illustration of a pseudo STS-3 frame for use in multiplexing VRH-RZ (Variable Rate High Speed-RZ) data. Referring to FIG. 7, for the 1,129.984 Mb/s RZ signal, the data is multiplexed into the pseudo STS-3 frame for VRH-RZ data table 700 shown in FIG. 7 in blocks of 10-bits at 112.9984 MHz. For the 564.992 Mb/s signal, the data is multiplexed into the pseudo STS-3 frame for VRH-RZ data table 700 shown in FIG. 7 in blocks of 5-bits at 112.9984 MHz. This allows the same clock and logic structure to be reused. Again, the byte definition of each of the entries in the pseudo STS-3 frame for VRH-RZ data table 700 of FIG. 7 can be found in FIG. 8. A skilled artisan would have available a variety of methods to interface to RZ signals, several approaches of which are disclosed in provisional patent application Ser. No. 60/289,940, entitled, "System and Method for Recovering RZ Formatted Data Using NRZ Clock and Data Recovery," having inventors Nicholas J. Possley and David B. Upham, filed on May 9, 2001.

FIG. 8 illustrates frame byte definitions for the pseudo STS-3 frames shown in FIGS. 5-7. Referring to FIG. 8, the byte definition table 800 includes a corresponding definition of each byte entry of the pseudo STS-3 frame tables 500, 600, and 700 shown in FIGS. 5-7, respectively for Gigabit ethernet data, fiber channel data and VRH-RZ data, as well as their corresponding value. For example, bytes A1 and A2 corresponds to the framing byte with values of 0xF6 and 0x28, respectively. Moreover, bytes R, R1, and R2 correspond to the 8 bit fixed stuff, 9 bit fixed stuff and 10 bit fixed stuff, respectively, having values of 0xFF, 0x1FF and 0x3FF, respectively.

Referring back to FIGS. 5-7, as can be seen, the STS-3 frames are scrambled using the standard SONET scrambler and sent to the modem 140 (FIG. 1). Further, the frame contains fixed stuff bytes and variable stuff bytes which are included due to data rate mismatch. Additionally, the STS-3 frames shown in FIGS. 5-7 contain parity BIP-8 bytes used for performance monitoring and establishing Signal Degrade conditions over the data link. In particular, the parity is determined over each pseudo STS-1 within each of the pseudo STS-3s. Moreover, as can be seen, the frame also contains ID bytes which are used to authenticate the source of the data and order. In particular, if the order or authentication does not match, then a cross-connect fault may be declared on the drop side. Additionally, the frame further contains an Alarm Notification Signal (ANS) byte which is used to indicate to the far end drop-side that there is a near end add-side defect. Furthermore, for fault isolation, LOS defect may be accumulated to provide a LOS fault, while LOL may be accumulated to provide a LOL fault.

FIG. 9 illustrates a configurable STS-3 frame for a VRVH (Variable Rate Very High) circuit pack in accordance with another embodiment of the present invention, while FIG. 10 illustrates a table showing the configuration parameters for each data rate for the configurable STS-3 frame of FIG. 9.

In one embodiment, the VRVH circuit pack is configured to support non-standard signals in the range from 565 Mb/s to 1,184.265 Mb/s. In particular, the STS-3 frame shown in FIG. 9 has the same number of bits per frame as an STS-3 data which is 2,160 bits per row. Furthermore, the VRVH circuit pack may be configured to provide the functionality of transparently transporting the non-standard signals through the data network system. The data network system may be through-timed from the input signals, with the data being multiplexed into the STS-3 frame shown in FIG. 9. Furthermore, as shown, FIG. 10 illustrates the frame parameters for the various signal types as applied to the STS-3 frame shown in FIG. 9.

FIG. 11 illustrates frame byte definitions for the frame for the STS-3 and the corresponding data rate for the various signal types as shown in FIG. 9-10, respectively. Referring to the figure, it can be seen that, for example, bytes A1 and A2 correspond to framing bytes with values of 0xF6 and 0x28, respectively. Moreover, bytes R(0), R(1), and R(2) correspond to 8, 9 and 10 bit fixed stuff having values of 0xFF, 0x1FF, and 0x3FF, respectively. Furthermore, referring back to FIG. 10, the NEC1.12 parameters were selected based upon an 8 KHz frame rate, and due to the PLL divider limitations, the frame rate may be slightly different.

Figure 12:
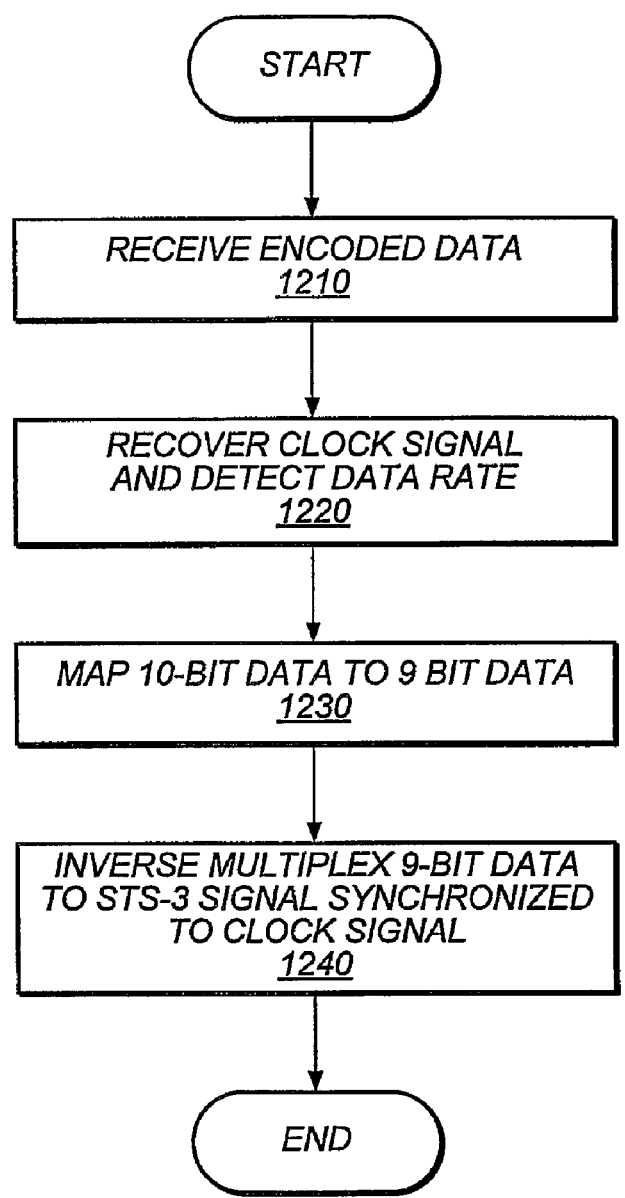
FIG. 12 illustrates a flowchart for providing data translation in the add direction in accordance with one embodiment of the present invention.

FIG. 12 illustrates a flowchart for providing data translation in the add direction in accordance with one embodiment of the present invention. Referring to FIG. 12, in the add direction, at step 1210, the 8B/10B encoded data is received. Thereafter at step 1220, the clock signal from the received data is recovered and the data rate is detected. At step 1230, the 10-bit data is mapped to corresponding 9-bit code using a look-up table as shown in FIG. 1, and at step 1240, the 9-bit code is inverse multiplexed to corresponding pseudo STS-3 signals which are synchronized to the clock signal of the encoded data received at step 1210.

Figure 13:
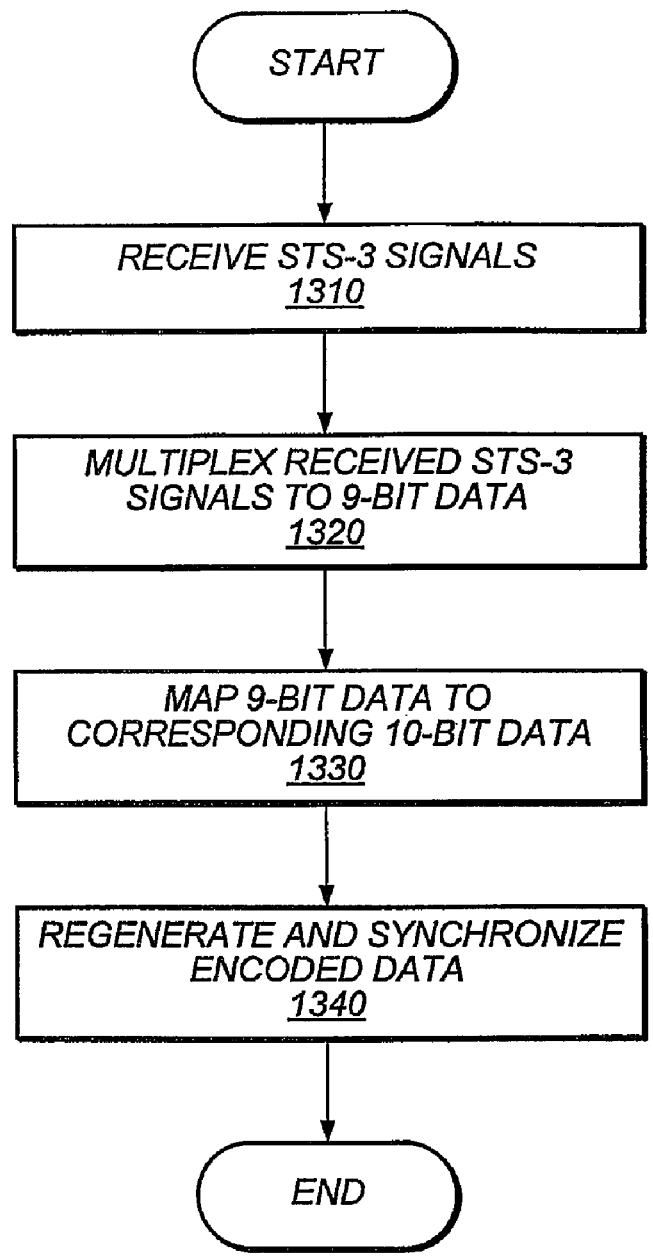
FIG. 13 illustrates a flowchart for providing data translation in the drop direction in accordance with one embodiment of the present invention.

FIG. 13 illustrates a flowchart for providing data translation in the drop direction in accordance with one embodiment of the present invention. Referring to FIG. 13, at step 1310, a plurality of STS-3 signals are received and at step 1320, the received STS-3 signals are multiplexed into 9-bit data. Thereafter at step 1330, the multiplexed 9-bit data is mapped to corresponding 10-bit data. Finally, at step 1340, the 8B/10B encoded data corresponding to the 10-bit data is regenerated after being synchronized with the received STS-3 signals.

As discussed above, in accordance with one embodiment of the present invention, in the add direction, the Gigabit Ethernet, RZ signals, or Fiber Channel data is inverse multiplexed into eight pseudo STS-3 data streams. The data network system 100 then modulates and sums the data stream with all other data streams for transport over an optical fiber connection. At the far end, the data network system 100 receives the eight pseudo STS-3 signals from the modem 140 and multiplexes the data back into the original high speed data stream. U.S. patent application Ser. No. 09/851,593, now abandoned, entitled "Variable Rate High-Speed Input and Output in Optical Communication Network," having inventors Tian Shen, Robert B. Clarke, Jr., Thomas J. Roman, David B. Upham, David A. Pechner, and Laurence J. Newell, filed on May 8, 2001, and assigned to the assignee of the present application, Kestrel Solutions, Inc., provides additional examples of variable rate high speed input and output in an optical network using optical frequency division multiplexing, the disclosure of which is incorporated in its entirety by reference for all purposes.

In the drop direction, the data network system 100 may be configured to receive both sets of eight data streams from each of the drop cross-connects. Accordingly, SONET framers may be used to frame-up each of the pseudo STS-3s, with the delay compensated for between each of the pseudo STS-3's in each set of eight data streams. It should be noted that the delay is compensated for between the pseudo STS-3's in a set. In one aspect, the maximum delay between any pseudo STS-3 is approximately 26.3 μs. Since this delay value is much less than the frame period of approximately 125 μs, the alignment of the pseudo STS-3's may occur where the framing pulses are nearest to each other. Moreover, it should be noted that in both the add and drop directions, the system 100 may be configured to perform a predetermined level of performance monitoring and fault detection on the data stream.

In one aspect of the present invention, a Gigabit Ethernet Circuit Pack proposed by the assignee of the present invention, Kestrel Solutions, is configured to provide an additional interface added to the low speed shelf, the added interfaces including 1250 Mbps Gigabit Ethernet, 1062.5 Mbps Fiber Channel, 1129.984 Mb/s Return-to-Zero (RZ) data and 564.992 Mbps RZ data. The circuit pack is thus configured to provide the functionality of transparently transporting these signal formats through the backend of a data network which is through-timed from the input signals.

In particular, as discussed above, since both the Gigabit Ethernet and the Fiber Channel signals are encoded using the 8B/10B encoding scheme, the 8 bits are transmitted into 10 bits for the purpose of transition density of data for the clock recoveries and parity information for additional error detection. Indeed, since the 8 bits are mapped into two sets of 10-bit codes, the two sets providing the parity information, it can be seen that only a maximum of 512 different codes need be used. Furthermore, by examining the code table in IEEE 802.3 publication, it can be seen that 72 of the 512 codes are duplicates, which leaves 440 codes for the data. Additionally, apart from the data, IEEE 802.3 publication defines 12 special codes used for various functions such as start-of-packet, error propagation, end-of-pocket, idle, and so on, with parity that gives 24 codes. Therefore, the total number of codes is 464 codes, which can be fully represented by 9-bit codes. Indeed, in accordance with one aspect of the present invention, to ensure that parity and special code functions are passed onto the customers, the data may be transported transparently, as described above, for example, where 9-bit codes can fully represent the data.

In the manner described above, in accordance with the present invention, there is provided method and system for providing data transmission with transparency over the Gigabit Ethernet data stream which includes receiving the 10 bit code with a data rate of 1,250 Mbits/second from the encoded 8B/10B data and arbitrarily selecting 9 bit codes using a look-up translation table which can fully represent the 10 bit codes received. The translated 9 bit codes with a data rate of 1,125 Mbits/second is then provided to eight STS-3 inverse multiplexer which inverse multiplexes the received codes into eight STS-3 data streams each with a data rate of 155.52 Mbits/second+ offset Δ which are then provided to the modem at the far end.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of transporting data through a data network, comprising:
   receiving encoded data comprising non-STS data;
   mapping said received data to predetermined data;
   inverse multiplexing said mapped predetermined data into a plurality of STS-3 signals; and
   transmitting the non-STS data over the STS-3 signals in pseudo STS frames, said pseudo STS frames including a same number of bits as a standard STS frame;
   wherein within each pseudo STS frame line overhead bytes and one or more path overhead bytes of a standard STS frame are replaced by stuff bytes with a fixed value.

2. The method as recited in claim 1, wherein the non-STS data includes one or more of:
   Gigabit Ethernet data;
   Fibre Channel data;
   variable rate high speed-RZ (VRH-RZ) data; and
   variable rate very high speed (VRVH) data.

3. The method as recited in claim 1, wherein the non-STS data is 8B/10B encoded and the predetermined data fully represents all non-redundant 8B/10B codes and at least one of each group of redundant 8B/10B codes using 9-bit codes.

4. The method as recited in claim 3, wherein said mapping comprises querying a lookup translation table for the 9-bit codes.

5. The method as recited in claim 3 wherein said receiving further includes recovering a clock signal from said received encoded data.

6. The method as recited in claim 5 wherein said clock signal has a rate one tenth of a data rate of the non-STS data.

7. The method as recited in claim 5 wherein said inverse multiplexing includes synchronizing said inverse multiplexed predetermined data to an OC-3 clock derived from a phase locked loop, wherein the phase lock loop is configured to frequency convert the clock signal to a predetermined frequency and convert the predetermined frequency to the OC-3 clock.

8. The method as recited in claim 6 wherein the data rate of the non-STS data is greater than the aggregate data rate of the plurality of STS-3 signals.

9. An apparatus for providing data transport through a data network, comprising:
   a clock recovery unit configured to receive encoded data comprising non-STS data;
   a data translation unit coupled to said clock recovery unit, wherein said translation unit is configured to translate said received data to predetermined data; and
   an inverse multiplexer coupled to said data translation unit, wherein said inverse multiplexer is configured to:
      inverse multiplex said translated predetermined data into a plurality of STS-3 signals, whereby the non-STS data is transmitted over the STS-3 signals in pseudo STS frames, said pseudo STS frames including a same number of bits as a standard STS frame;
   wherein within each pseudo STS frame, line overhead bytes and one or more path overhead bytes of a standard STS frame are replaced by stuff bytes with a fixed value.

10. The apparatus as recited in claim 9, wherein the non-STS data includes one or more of:
    Gigabit Ethernet data;
    Fibre Channel data;
    variable rate high speed-RZ data (VRH-RZ); and
    variable rate very high speed (VRVH) data.

11. The apparatus as recited in claim 9, wherein the non-STS data is 8B/10B encoded and the predetermined data fully represents all non-redundant 8B/10B codes and at least one of each group of redundant 8B/10B codes using 9-bit codes.

12. The apparatus as recited in claim 11, wherein said translation unit comprises a lookup translation table.

13. The apparatus as recited in claim 11 wherein said clock recovery unit is further configured to recover a clock signal from said received encoded data.

14. The apparatus as recited in claim 13 wherein said clock signal has a rate one tenth of a data rate of the non-STS data.

15. The apparatus as recited in claim 13 wherein said inverse multiplexer is further configured to synchronize said inverse multiplexed predetermined data to an OC-3 clock derived from a phase locked loop, wherein the phase locked loop is configured to frequency convert the clock signal to a predetermined frequency and convert the predetermined frequency to the OC-3 clock.

16. The apparatus as recited in claim 14 wherein the data rate of the non-STS data is greater than the aggregate data rate of the plurality of STS-3 signals.

17. A system for providing data transport through a data network, comprising:
    a first apparatus comprising:
       a clock recovery unit configured to receive encoded data comprising non-STS data;
       a first data translation unit coupled to said clock recovery unit, wherein said translation unit is configured to translate said received data to first predetermined data; and
       an inverse multiplexer coupled to said data translation unit and configured to:
          inverse multiplex said translated predetermined data into a plurality of STS-3 signals, whereby the non-STS data is transmitted over the STS-3 signals in pseudo STS frames, said pseudo STS frames including a same number of bits as a standard STS frame; and wherein within each pseudo STS frame, line overhead bytes and one or more path overhead bytes of a standard STS frame are replaced by stuff bytes with a fixed value;
a second apparatus comprising:
   a receiver configured to receive the plurality of STS-3 signals;
   a plurality of queues each configured to frame align a corresponding one of the plurality of STS-3 signals;
   a multiplexer configured to multiplex received data including said frame aligned signals;
   a second data translation unit coupled to said multiplexer configured to translate said multiplexed data to second predetermined data; and
   a serializer coupled to said second data translation unit configured to receive said translated second predetermined data and regenerate the encoded non-STS data.

18. The system as recited in claim 17, wherein the non-STS data is includes one or more of:
Gigabit Ethernet data;
Fibre Channel data;
variable rate high speed-RZ data (VRH-VZ); and
variable rate very high speed (VRVH) data.

19. The system as recited in claim 17, wherein the non-STS data is 8B/10B encoded and the first predetermined data fully represents all non-redundant 8B/10B codes and at least one of each group of redundant 8B/10B codes using 9-bit codes.

20. The system as recited in claim 19;
wherein said first data translation unit comprises a first lookup translation table; and
wherein said second data translation unit comprises a second lookup translation table.

21. The system as recited in claim 19 wherein said clock recovery unit is further configured to recover a clock signal from said received encoded data.

22. The system as recited in claim 21 wherein said clock signal has a rate one tenth of a data rate of the non-STS data.

23. The system as recited in claim 21 wherein said inverse multiplexer is further configured to synchronize said inverse multiplexed first predetermined data to an OC-3 clock derived from a phase locked loop, wherein the phase locked loop is configured to frequency convert the clock signal to a predetermined frequency and to convert the predetermined frequency to the OC-3 clock.

24. The system as recited in claim 22 wherein the data rate of the non-STS data is greater than the aggregate data rate of the plurality of STS-3 signals.

25. A method of transporting data through a data network, comprising:
receiving encoded data comprising non-STS data;
mapping said received data to first predetermined data; and
inverse multiplexing said mapped first predetermined data into a plurality of STS-3 signals, whereby the non-STS data is transmitted over the STS-3 signals in pseudo STS frames, said pseudo STS frames including a same number of bits as a standard STS frame; and
wherein within each pseudo STS frame, line overhead bytes and one or more path overhead bytes of a standard STS frame are replaced by stuff bytes with a fixed value;
receiving the transmitted plurality of STS-3 signals;
frame aligning each of the plurality of STS-3 signals;
multiplexing received data including said frame aligned signals;
mapping said multiplexed data to second predetermined data; and
regenerating the encoded non-STS data from the translated second predetermined data.

26. The method as recited in claim 25, wherein the non-STS data includes one or more of:
Gigabit Ethernet data;
Fibre Channel data;
variable rate high speed-RZ data (VRH-RZ); and
variable rate very high speed (VRVH) data.

27. The method as recited in claim 25, wherein the non-STS data is 8B/10B encoded and the first predetermined data fully represents all non-redundant 8B/10B codes and at least one of each group of redundant 8B/10B codes using 9-bit codes.

28. The method as recited in claim 27;
wherein said first mapping comprises querying a first lookup translation table for the first predetermined data; and
wherein said second mapping comprises querying a second lookup translation table for the second predetermined data.

29. The method as recited in claim 27 wherein said receiving encoded data further includes recovering a clock signal from said received encoded data.

30. The method as recited in claim 29 wherein said clock signal has a rate one tenth of a data rate of the non-STS data.

31. The method as recited in claim 29 wherein said inverse multiplexing includes synchronizing said inverse multiplexed first predetermined data to an OC-3 clock derived from a phase locked loop, wherein the phase lock loop is configured to frequency convert the clock signal to a predetermined frequency and convert the predetermined frequency to the OC-3 clock.

32. The method as recited in claim 30 wherein the data rate of the non-STS data is greater than the aggregate data rate of the plurality of STS-3 signals.

* * * * *